(12) United States Patent
Hazenbroek

(10) Patent No.: US 9,763,459 B2
(45) Date of Patent: Sep. 19, 2017

(54) ANIMAL PART HOLDER

(71) Applicant: Foodmate B.V., Oud-Beijerland (NL)

(72) Inventor: Jacobus Eliza Hazenbroek, Oud-Beijerland (NL)

(73) Assignee: Foodmate, B.V. (NL)

( * ) Notice: Subject to any disclaimer, the term of this patent is extended or adjusted under 35 U.S.C. 154(b) by 98 days.

(21) Appl. No.: 14/813,428

(22) Filed: Jul. 30, 2015

(65) Prior Publication Data
US 2016/0029650 A1 Feb. 4, 2016

Related U.S. Application Data

(60) Provisional application No. 62/030,709, filed on Jul. 30, 2014.

(51) Int. Cl.
*A22C 21/00* (2006.01)

(52) U.S. Cl.
CPC ...... *A22C 21/0046* (2013.01); *A22C 21/0053* (2013.01)

(58) Field of Classification Search
CPC ............ A22B 7/005; A22B 5/007; A22B 7/02
USPC ............... 452/125, 128, 149, 150, 153, 185, 452/187–192, 195; 43/17.2; 294/110.1, 294/110.2, 118, 119, 119.2, 66.1
See application file for complete search history.

(56) References Cited

U.S. PATENT DOCUMENTS

| | | | | |
|---|---|---|---|---|
| 3,790,205 A | * | 2/1974 | Wenz | C03B 9/447 294/115 |
| 3,837,699 A | * | 9/1974 | Anderson | A22B 5/0029 294/118 |
| 3,948,552 A | * | 4/1976 | Hamrick | B65B 21/12 294/115 |
| D245,972 S | * | 10/1977 | Kifer | D34/33 |
| 4,109,952 A | * | 8/1978 | Monzain | B65G 7/12 294/118 |
| 4,445,719 A | * | 5/1984 | Miller | B66C 1/62 294/206 |
| 4,452,481 A | * | 6/1984 | Williams | B66C 1/64 294/118 |
| 4,530,539 A | * | 7/1985 | Gaber | A47D 1/106 297/134 |
| D283,289 S | | 4/1986 | Hazenbroek | |
| 4,993,113 A | | 2/1991 | Hazenbroek | |
| 5,035,673 A | | 7/1991 | Hazenbroek | |

(Continued)

*Primary Examiner* — Richard Price, Jr.
(74) *Attorney, Agent, or Firm* — Womble Carlyle Sandridge & Rice LLP

(57) ABSTRACT

An animal part holder has first and second gripper plates between which an animal part can be slid. A mechanism coupled to the gripper plates for yieldably biasing the gripper plates toward one another so that the gripper plates engage and grip an animal part disposed between the gripper plates. In addition, the mechanism is configured to cause the gripper plates to tighten their grip on the animal part in response to a pulling force tending to pull the animal part out of the grip of the holder. A method of gripping the bone of an animal part includes disposing the bone between gripper plates and applying a biasing force to the gripper plates to cause the gripper plates to bear against the bone with a force. The method may further include applying a force to the gripper plates greater than the biasing force in response to a pulling force applied to the animal part to cause the gripper plates to grip the bone tighter.

20 Claims, 5 Drawing Sheets

(56) References Cited

U.S. PATENT DOCUMENTS

| | | |
|---|---|---|
| 5,069,652 A | 12/1991 | Hazenbroek |
| 5,098,333 A | 3/1992 | Cobb |
| 5,147,240 A | 9/1992 | Hazenbroek et al. |
| 5,290,187 A | 3/1994 | Meyn |
| 5,299,975 A | 4/1994 | Meyn |
| 5,299,976 A | 4/1994 | Meyn |
| 5,336,127 A | 8/1994 | Hazenbroek |
| 5,340,351 A | 8/1994 | Minderman et al. |
| 5,342,237 A | 8/1994 | Kolkman |
| 5,366,406 A | 11/1994 | Hobbel et al. |
| 5,487,700 A | 1/1996 | Dillard |
| D373,883 S | 9/1996 | Dillard |
| 5,666,758 A * | 9/1997 | Vaillier .................. A01K 97/24 294/110.1 |
| 5,713,786 A | 2/1998 | Kikstra |
| 5,766,063 A | 6/1998 | Hazenbroek et al. |
| 5,795,003 A * | 8/1998 | Nerger .................... B23Q 1/28 294/106 |
| 5,875,738 A | 3/1999 | Hazenbroek et al. |
| 6,179,702 B1 | 1/2001 | Hazenbroek |
| 6,322,438 B1 | 11/2001 | Barendregt et al. |
| 6,375,560 B1 | 4/2002 | Verrijp |
| 6,478,668 B2 | 11/2002 | Visser et al. |
| 6,656,032 B2 | 12/2003 | Hazenbroek et al. |
| 6,764,393 B1 | 7/2004 | Hazenbroek et al. |
| 6,811,480 B2 | 11/2004 | Moriarty et al. |
| 6,830,508 B2 | 12/2004 | Hazenbroek et al. |
| 7,115,030 B2 | 10/2006 | Vn Hillo et al. |
| 7,261,629 B2 | 8/2007 | Holleman |
| 7,635,294 B2 * | 12/2009 | Tomcak ............... A22B 5/0035 452/135 |
| 8,267,241 B2 | 9/2012 | den Boer et al. |
| 8,678,176 B2 | 3/2014 | Hazenbroek |
| 2005/0037705 A1 | 2/2005 | Beeksma et al. |
| 2005/0048894 A1 | 3/2005 | Van Hillo et al. |

\* cited by examiner

ANIMAL PART HOLDER

REFERENCE TO RELATED APPLICATION

Priority is hereby claimed to the filing date of U.S. provisional patent application 62/030,709 filed on Jul. 30, 2014, the entire contents of which is hereby incorporated by reference.

TECHNICAL FIELD

This disclosure relates generally to meat processing and more specifically to devices for holding the bones of suspended meat parts securely as the meat parts are conveyed along a processing path and processed at processing stations.

BACKGROUND

Modern processing of meat and meat parts usually includes suspending animals and cut-away animal parts from overhead holding devices that convey the animals and animal parts along a processing path. This is particularly true for poultry and poultry parts, which today are processed largely by automated cut-up and processing machines disposed at stations along the processing path. The discussion that follows will disclose the present invention for purposes of clarity in terms and within the context of poultry processing and specifically the processing of chickens. It will be understood, however, that the processing of chickens is not a limitation of the invention and that the invention is applicable to any meat processing operation wherein meat parts are suspended from an overhead conveyor.

Several devices are available for holding chickens and chicken parts in a suspended orientation as they move along a processing path. For example, shackles have long been used to suspend chickens and chicken carcasses by their legs as they are moved in sequence along a poultry processing path. Another example is hook-shaped holders having a space defined between two fixed upstanding prongs. Such, holders often are used to hold the bone of a chicken part securely as the meat is stripped away from the bone or as other cut-up and processing steps are performed. For instance, legs and drumsticks often are suspended from such holders by the ankle joint, which has a large diameter compared to the diameter of the attached leg bone. The leg bone slides easily into the space between the upstanding prongs and the larger ankle joint is disposed in the fork of the holder and is too large to slip through the space in most cases, but not all. In some cases, the ankle bone does slip out of the space and the chicken part may be ruined or require hand processing. Pronged holders and shackles have therefore not proven completely reliable for holding securely the chicken carcasses and chicken parts as they are pulled on and processed by modern processing machines.

The problem stems in part from the fact that the joints at the ends of bones may vary in size relative to the diameter of the bone and, in fact, can vary significantly is size from chicken to chicken. They also can be rather slippery and contain more soft cartilage relative to the bones to which they are attached. As a consequence, a significant percentage of chicken parts tend to slip out of traditional holders as suspended carcasses and parts encounter meat stripping, cut-up, and other processing machines along the processing line. This can result in unwanted waste and can require that the slipped-out chicken parts be hand processed, which is inefficient and costly.

A need exists for a holder that grips the bones of meat parts and particularly chicken parts in such a way that the bones are not pulled out of the holder as chickens and chicken parts are conveyed through meat strippers, cut-up stations, and other processing equipment. It is to the provision of a meat part holder that addresses this and other needs that the present invention is primarily directed.

SUMMARY

Briefly described, a meat part holder is attachable to an overhead conveyer system that carries the holders in single file along a processing path. The holder has a pair of opposing gripper plates that are biased toward one another by a spring. When the bone of a chicken part is slipped between the opposing gripper plates just below a joint at the end of the bone, the gripper plates are forced apart against the bias of the spring to allow the bone to slide into a space between the plates. The spring then biases the gripper plates firmly against the bone just below the joint. The biasing force of the spring ensures that the gripper plates remain in firm contact with the bone just below the joint to prevent the joint of the bone from slipping through the gripper plates. Furthermore, pivot arms are arranged such that the gripper plates actually exert more force against the bone as the meat part is pulled downwardly away from the meat part holder. This occurs, for instance, as the part encounters a meat stripping machine disposed along the processing path, which pulls downwardly on the meat to separate the meat from the bone. As a result, a bone between the gripper plates is held even more firmly in response to downward force applied to a chicken part. The suspended bones of chicken parts such as, for example, poultry thighs no longer slip out of their holders during processing, thereby increasing efficiency and return rates.

The invention will be understood better upon review of the detailed description set forth below taken in conjunction with the accompanying drawing figures, which are briefly described as follows.

DETAILED DESCRIPTION

The specific example described below will be given for clarity within the context of suspending chicken thighs from the illustrated holder that exemplifies the invention. It will be understood, however, that the invention is not limited to use with chicken thighs and is applicable to suspending whole chickens, chicken carcasses, drumsticks, and other chicken parts as they are moved along a processing line.

Figure 1:
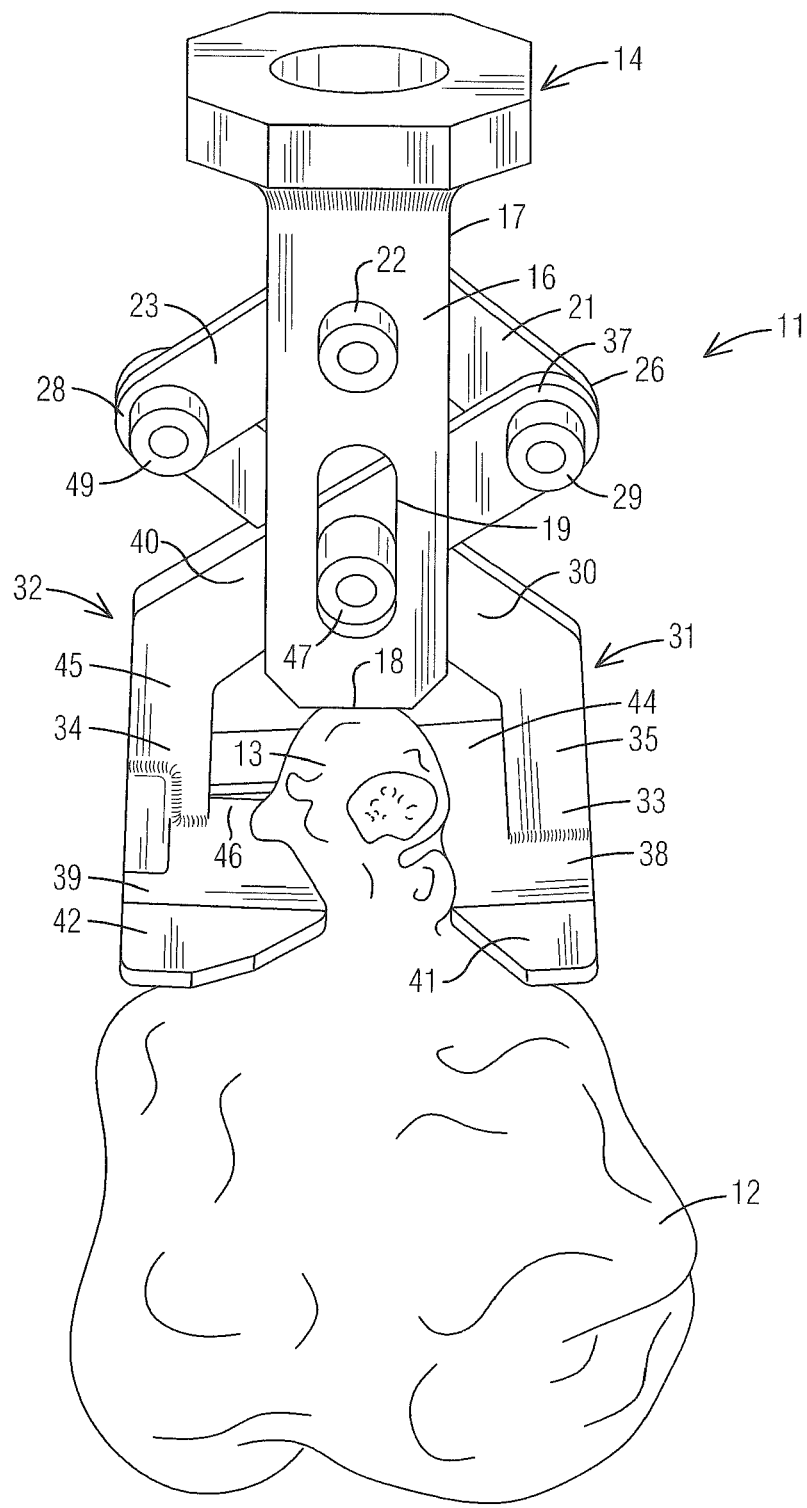
FIG. 1 is a view from the front showing a holder according to the invention holding a chicken thigh.

Referring now to the drawing figures, wherein like reference numerals indicate like parts throughout the several views, FIG. 1 shows a meat part holder 11 that embodies principles of the present invention in one preferred form. The holder 11 in this instance is shown holding the leg bone of a chicken thigh 12 just below the knee joint 13 of the leg bone. The thigh is thus suspended from the holder as shown as the holder and the thigh are moved along the processing path. The holder includes a mounting head 14 by which the holder may be mounted through a remounting device (not shown) to an overhead conveyor system in a known manner. The mounting device may include turning blocks and the like to allow the holder 11 to be rotated to various orientations for processing as it moves along the processing path.

An elongate plate 16 is secured to and depends from the mounting head 14 and has an upper end portion 17 and a lower end portion 18. An elongated guide slot 19 is formed through the plate 16 as shown, which accommodates vertical movement of the head of a pivot bolt 47, as described in more detail below. A first tension arm 21 has a proximal end 24 (FIG. 2) and a distal end 26 and is pivotally mounted to the plate 16 at is proximal end by means of pivot bolt 22. A second tension arm 23 likewise is pivotally mounted at its proximal end 27 (FIG. 2) to the plate 16 by means of the same pivot bolt 22 and extends to a distal end 28. Both tension arms are secured sufficiently loosely to the pivot bolt 22 so that they are held in place but free to pivot about the axis of the pivot bolt 22.

A first leg 31 has a crooked configuration rather resembling a hockey stick and defines an angled upper portion 30 and a generally vertically extending lower portion 35. The first leg 31 has a proximal end 36 (FIG. 2) and a distal end 33. Similarly, a crooked second leg 32 has an upper portion 40, a lower portion 45, a proximal end 37 and a distal end 34. The first and second legs 31 and 32 are pivotally connected together intermediate the ends of their upper portions in scissor-like fashion by means of pivot bolt 47. The proximal end 36 (FIG. 2) of the first leg 31 is pivotally connected to the distal end of tension arm 23 by means of pivot bolt 49. Likewise, the proximal end 37 of the second leg 32 is pivotally connected to the distal end of tension arm 21 by means of pivot bolt 49. The head of the pivot bolt 47 that pivotally attaches the two legs 31 and 32 is slidably captured within the guide slot 19.

Figure 3:
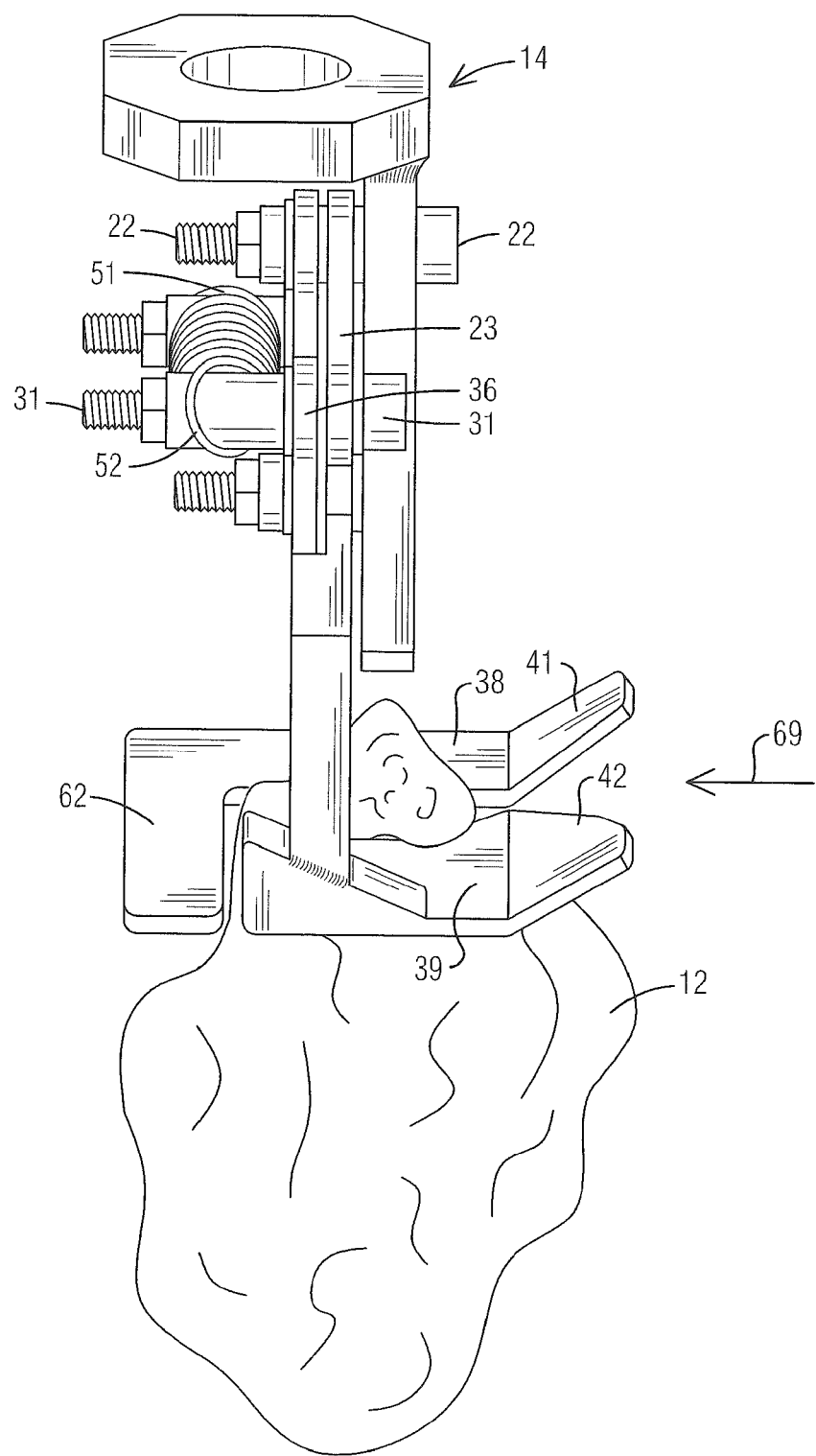
FIG. 3 is a view from the side showing the holder of FIG. 1 holding a chicken thigh.
Figure 4:
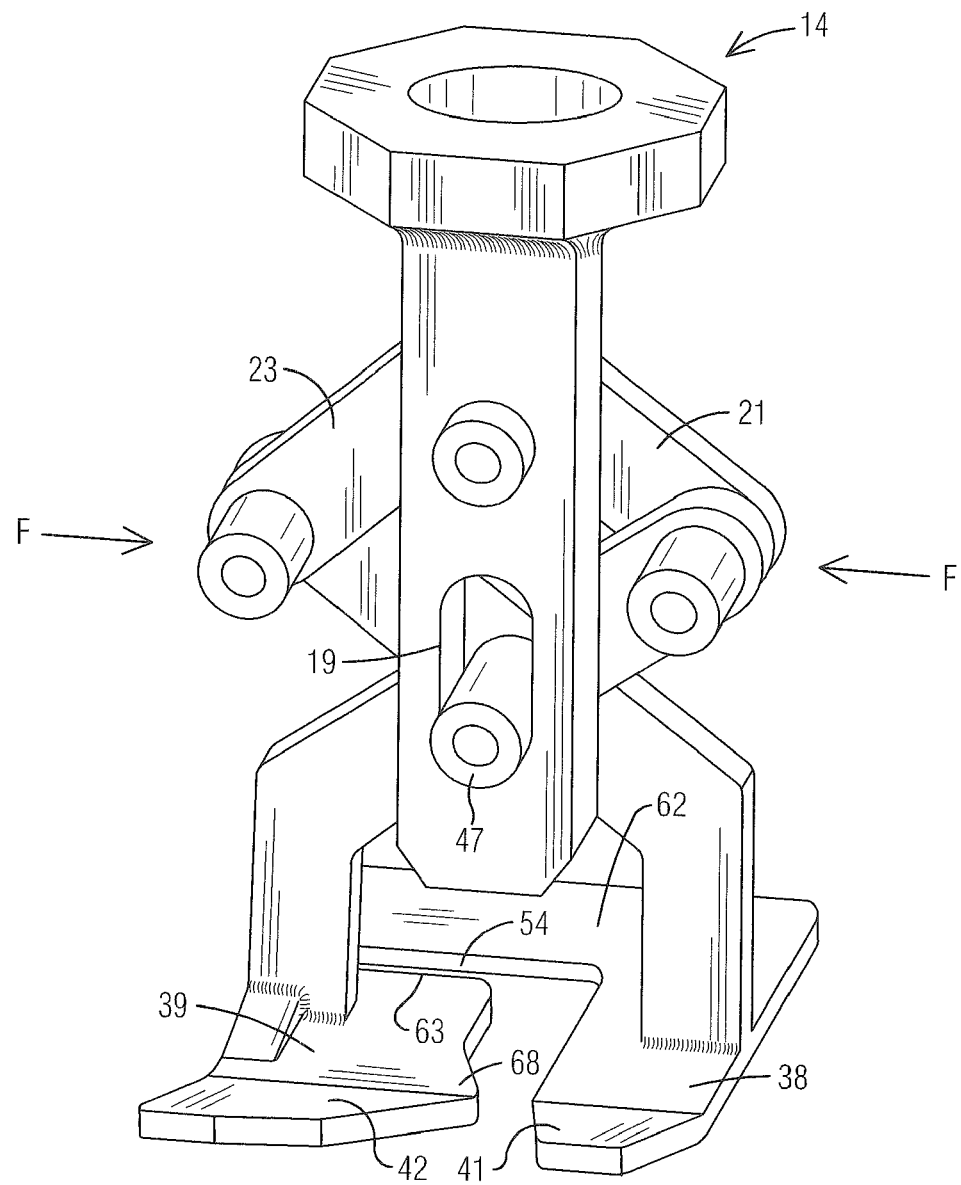
FIG. 4 is perspective view of the holder of FIG. 1 in its fully closed configuration.

A first gripper plate 38 having a rear end 44 is welded or otherwise attached to the distal end of leg 31 and a second gripper plate 39 having a rear end 46 is welded to the distal end of leg 32. As perhaps best illustrated in FIG. 3, the first gripper plate 38 is formed with a narrowing upturned forward end 41. Similarly, the second gripper plate 39 is formed with a narrowing upturned forward end 42. The forward ends of the gripper plates together define a tapered slot through which a worker may insert the bone of a chicken thigh to load the chicken thigh into the holder, as illustrated by arrow 69 in FIG. 3. As shown in FIG. 4, the first gripper plate 38 extends rearwardly further than the second gripper plate 39 and is formed with a stop portion 62. The stop portion 62 extends to the left in FIG. 4 and behind the rear edge 63 of second gripper plate 39 and its edge 54 defines a stop. The stop portion 62 thus functions as a stop when a chicken thigh is loaded into the holder. This ensures that the bone of the chicken thigh becomes properly positioned between the gripper plates and does not move too far through the slot. Finally, the second gripper plate 39 in this embodiment is formed with a protrusion 68 that extends toward the first gripper plate 38. The protrusion 68 prevents the bone of a chicken thigh loaded into the holder from accidentally sliding forwardly out of the holder as it encounters various processing stations along the processing path.

Figure 2:
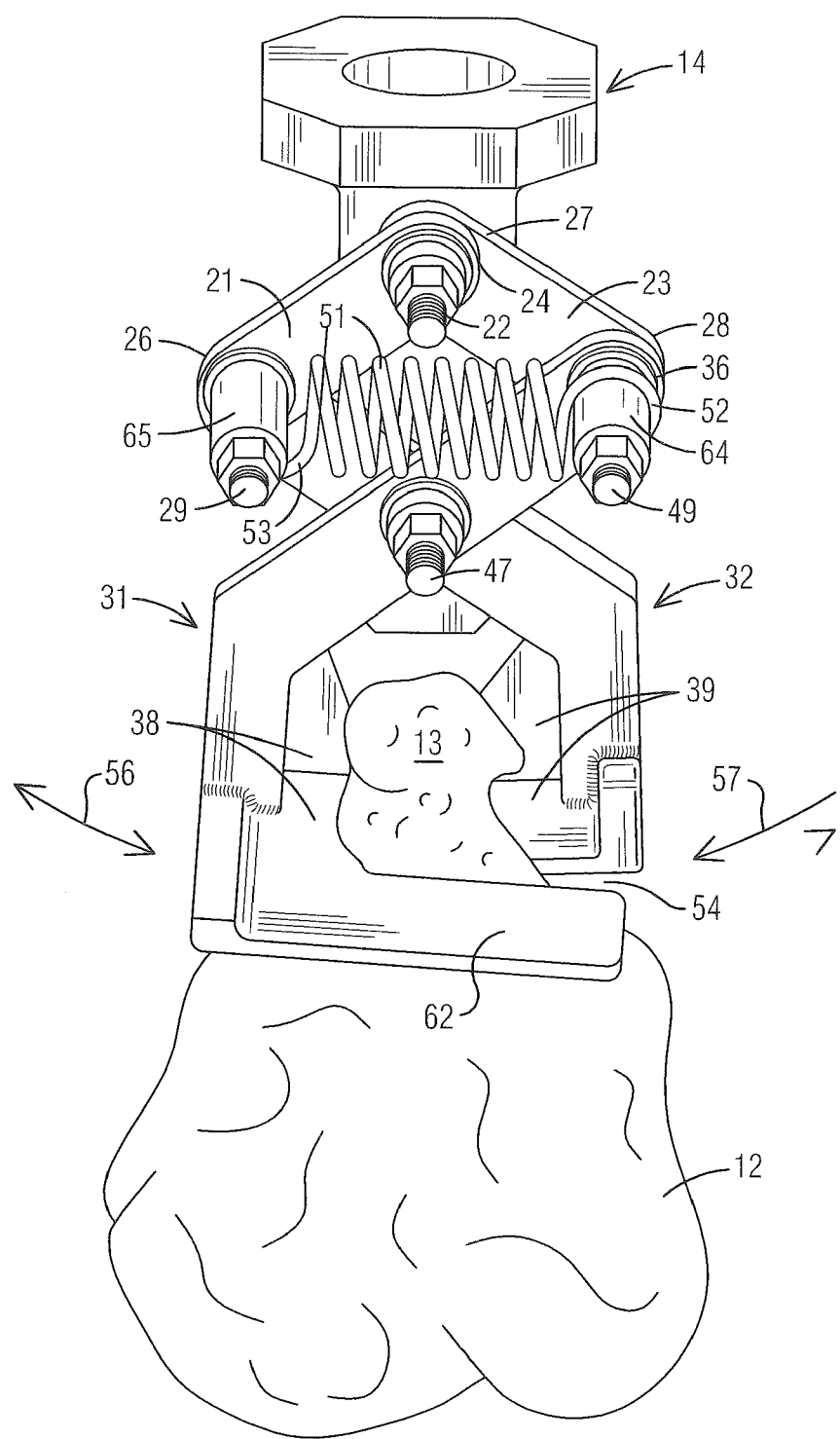
FIG. 2 is a view from the back showing the holder of FIG. 1 holding a chicken thigh.

Referring to FIG. 2, the pivot bolts 49 and 29 extend rearwardly from the tension arms and each is provided with a grommet 64 and 65 respectively. In the illustrated embodiment, an extension spring 51 extends between the pivot bolts 49 and 29 and its ends are attached to the grommets 64 and 65 by means of spring hooks 52 and 53. The extension spring pulls the pivot bolts 49 and 29 toward one another. This, in turn, yieldably biases the gripper plates 38 and 39 toward one another (indicated by arrows 56 and 57) due to the scissor-like pivoting about pivot bolt 47 of the first and second legs 31 and 32. Of course, other means of providing the biasing force can be substituted for the extension spring such as, for instance, compression springs, leaf springs, coil springs, or even magnets and all such alternatives are intended to be included within the scope of the invention exemplified in the figures.

Figure 5:
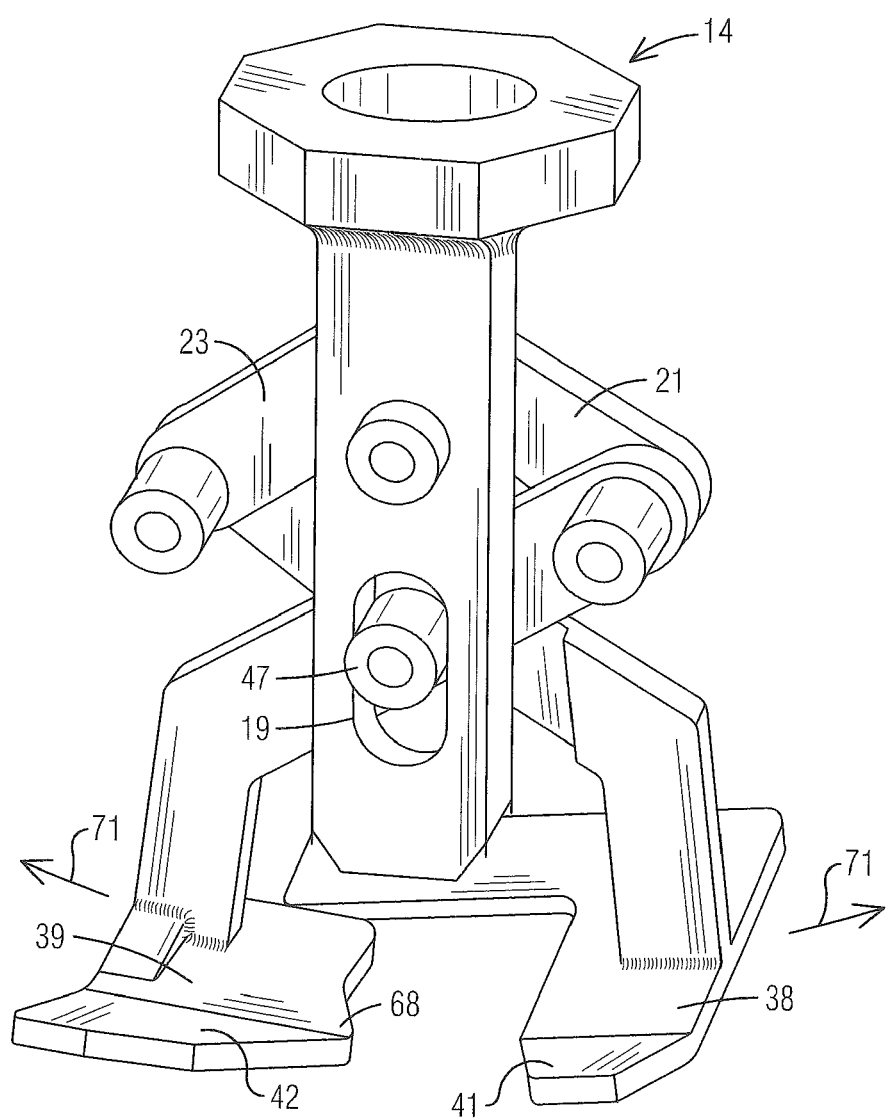
FIG. 5 is a perspective view of the holder of FIG. 1 in its fully opened configuration.

As shown in FIG. 4, the inward biasing force F provided by the extension spring 51 moves the gripper plates 38 and 39 toward one another until the head of the pivot bolt 47 engages the bottom of guide slot 19. This defines the minimum distance between the gripper plates, which preferably is less than the smallest diameter thigh bones that are expected to be loaded into the holder. Conversely, as illustrated in FIG. 5, the gripper plates 38 and 39 can be spread apart against the bias of the extension spring 51. As the gripper plates spread, the head of the pivot bolt 47 moves upwardly within the guide slot 19 until it engages with the upper end of the guide slot. This defines the maximum distance between the gripper plates, which preferably is greater than the largest diameter bones that are expected to be loaded into the holder.

In use, a plurality of holders is suspended in a spaced apart configuration from an overhead conveyer. The conveyor is designed to convey the holders in single file along a processing path pasta loading station. A worker or workers at the loading station loads chicken thighs into the holders by moving the end portions of the thigh bone of each chicken thigh 12 through the tapered slot defined by the narrowing upturned forward ends 41 and 42 of the gripper plates. As the bone of the poultry thigh 12 moves through the slot, the gripper plates are forced away from each other against the bias of the extension spring 51. When the bone of the poultry part moves beyond the inward projection 68 of the gripper plate 39, the gripper plates snap back toward one another under the influence of biasing force F provided by the extension spring.

Since the bone of the chicken thigh is wider than the minimum distance between the gripper plates, the snapping, back of the gripper plates causes the facing edges of the gripper plates to engage and grip the bone firmly with a force determined by the spring constant of the extension spring. The joint of the bone is now just above the gripper plates as shown in FIG. 1. The biased engagement of the bone by the gripper plates just beneath the joint inhibits the bone from being pulled downwardly out of the holder during meat stripping and other operations. This is because the joints, although not as large in the case of thighs as the ankle joint of a drumstick, still are larger than the diameter of the thigh bone itself. It is difficult for the larger joint to slide through the inwardly biased gripper plates.

Further, the inventor has discovered that downward force on a chicken thigh suspended from the gripper plates of the holder actually increases the force applied to the bone by the edges of the gripper plate. This is because any downward movement of the gripper plates, however slight, as a result of the downward force tends to pull down on the pivot bolt 47. This, in turn, causes the gripper plates to move toward one another as a result of the scissor motion of the legs 31 and 32 about the pivot bolt 47. Thus, the greater the force tending to pull a chicken thigh downwardly out of the holder, the more tightly the gripper plates grip the thigh bone of the thigh.

The ultimate result is that chicken thighs that previously have been prone to slip or be pulled out of fixed prong holders during meat stripping and other operations are held firmly and reliably within the holder of the present invention. Of course, on rare occasions, the joint may break away from the end of the bone; however, instances of this are much less common than joints slipping out of holding devices of the prior art. Thus, the inefficiencies attendant dealing with slipped-out poultry parts are virtually eliminated.

The invention has been illustrated and described in this disclosure in the form of one particular preferred embodiment that serves as an example of the much broader inventive concept. It will be apparent to the skilled artisan, however, that the invention is not limited to the illustrated exemplary embodiment but rather is far more expansive. For example, the particular configuration of the arms of the illustrated embodiment may be changed in many ways that perform the same function in the same way and obtain the same result. The extension spring may be otherwise configured and located. For example, a compression spring between the top of the guide slot 19 and the head of the pivot bolt 47 would fall within the scope of the invention, as would leaf springs or coil springs. Alternatively, attracting and/or repulsing magnets may be substituted for the compression spring to provide the biasing force. The illustrated embodiment is a prototype and the final embodiment is expected to be different in appearance but nevertheless within the scope of the invention illustrated by the prototype.

The holder of this invention has been found particularly useful for suspending chicken thighs from the overhead conveyor of a chicken cut-up line. However, virtually any meat part may be held by and suspended from the holder of the present invention with improved resistance to being pulled out of the holder. Therefore, traditional fixed prong holders that successfully, hold drumsticks suspended from their ankle joints may be replaced by holders of the present invention so that they may be used to suspend thighs and other hard-to-hold chicken parts as well. In fact, the inventor envisions that traditional shackles and other chicken part holders may well be replaced universally by the holder of the present invention. For example, pairs of holders according to the present invention may be substituted for the holding prongs of traditional shackles to suspend chickens and chicken carcasses securely by both legs from the conveyor system. The holders of this invention may be suspended from the conveyor, used to suspend parts as they move around a carousel, or both. These and other additions, deletions, and modifications, both subtle and gross, may be made to the illustrated embodiment of the invention described herein without departing from the spirit and scope of the invention itself, which is circumscribed only by the claims hereof.

What is claimed is:

1. An animal part holder configured to be attached to an overhead conveyor from which the animal part holder extends downwardly in a generally vertical orientation while being conveyed along a processing path by the overhead conveyor, the animal part holder comprising first and second opposing gripper plates disposed at a lower end of the animal part holder and being configured to spread apart in response to an animal part being slid in a generally horizontal direction between the gripper plates and a mechanism configured to bias the gripper plates yieldably toward one another so that the gripper plates are urged toward each other to engage and grip an animal part after the animal part is slid in a generally horizontal direction between the gripper plates, the mechanism including a tightening feature configured to cause the gripper plates to move closer together and tighten their grip on an animal part in response to a force on the animal part tending to pull the animal part in a downward direction away from the animal part holder when the animal part holder is suspended from the overhead conveyor.

2. An animal part holder as claimed in claim 1 wherein the mechanism comprises first and second legs to the ends of which the gripper plates are attached, the first and second legs being pivotally attached intermediate their ends such that pivotal movement of the legs moves the gripper plates toward and away from each other.

3. An animal part holder as claimed in claim 1 further comprising a stop associated with the gripper plates configured and positioned to engage and arrest the movement of an animal part being slid in a generally horizontal direction between the gripper plates when the animal part is correctly located between the gripper plates.

4. An animal part holder as claimed in claim 3 wherein the stop is integrally formed with at least one of the gripper plates.

5. An animal part holder as claimed in claim 1 wherein the mechanism is configured to bias the gripper plates yieldably toward one another comprises a biasing element selected from the group consisting essentially of springs and magnets.

6. An animal part holder as claimed in claim 5 wherein the biasing element comprises a spring.

7. An animal part holder as claimed in claim 6 wherein the spring is selected from the group consisting essentially of a compression spring, an extension spring, a coil spring, and a leaf spring.

8. An animal part holder as claimed in claim 5 wherein the biasing element comprises magnets.

9. An animal part holder as claimed in claim 8 wherein the magnets are arranged to attract one another or to repel one another.

10. An animal part holder as claimed in claim 1 wherein the mechanism includes a limiting feature configured to limit the relative movements of the gripper plates to a range between a minimum distance between the gripper plates and a maximum distance between the gripper plates.

11. An animal part holder as claimed in claim 10 wherein the limiting feature comprises a first pivot bolt associated with the gripper plates, the first pivot bolt being slidably captured within a pivot bolt slot such that relative movement of the gripper plates toward and away from one another causes the pivot bolt to slide within the pivot bolt slot.

12. An animal part holder as claimed in claim 1 wherein the tightening feature comprises a first arm attached to and extending from the first gripper plate, a second arm attached to and extending from the second gripper plate, and a first pivot bolt pivotally attaching the first and second arms together in a scissored relationship and being vertically movable so that downward vertical force on a meat part captured between the gripper plates tending to pull the first pivot bolt downwardly causing the first and second arms to pivot closer together and thus causing the gripper plates to tighten their grip on the animal part.

13. An animal part holder as claimed in claim 12 wherein the first and second arms extend beyond the first pivot bolt to free ends and further comprising a first tension arm having first and second ends and being attached at its first end to the free end of the first arm and a second tension arm having first and second ends and being attached at its first end to the free end of the second arm, the first and second tension arms being pivotally connected together at their second ends by a second pivot bolt located vertically above the first pivot bolt with the second pivot bolt being fixed against movement in a vertical direction.

14. An animal part holder as claimed in claim 13 further comprising a support plate, the second pivot bolt being fixed to the support plate.

15. An animal part holder as claimed in claim 14 wherein the first pivot bolt is slidably captured within a slot formed in the support plate.

16. A method of holding an animal part while the animal part is being processed, the method comprising the steps of disposing a portion of the animal part between a pair of gripper plates and applying a biasing force to the gripper plates to bias the gripper plates toward one another to bear against and grip the portion of the animal part with a predetermined gripping force and applying additional gripping force to the gripper plates in response to a pulling force on the animal part away from the gripper plates to cause the gripper plates to tighten their grip on the animal parted in response to the pulling force.

17. An animal part holder as claimed in claim 1 wherein one of the gripper plates comprises a protrusion that extends behind the other one of the gripper plates to form a stop that engages and arrests horizontal movement of an animal part between the gripper plates when the animal part is at a predetermined location between the gripper plates.

18. An animal part holder as claimed in claim 1 wherein adjacent forward ends of the first and second gripper plates together form a tapered slot into which an animal part is slid horizontally, movement of the animal part through the tapered slot causing the first and second gripper plates to spread apart.

19. An animal part holder as claimed in claim 18 wherein at least one of the gripper plates is formed with a projection extending toward the other one of the gripper plates at a terminal end of the tapered slot, movement of an animal part past the projection causing the gripper plates to move toward one another to grip the animal part behind the protrusion.

20. An animal part holder as claimed in claim 1 wherein the tightening feature comprises a first arm attached to and extending from the first gripper plate to a distal end and a second arm attached to and extending from the second gripper plate to a distal end, the first and second arms crossing each other and being pivotally attached at their crossing point by a lower pivot bolt, a first tension arm pivotally attached at one end to the distal end of the first arm and extending to a distal end, a second tension arm pivotally attached at one end to the distal end of the second arm and extending to a distal end, the distal ends of the first and second tension arms being pivotally attached together by an upper pivot bolt, the lower pivot bolt being vertically movable and the upper pivot bolt being vertically fixed, whereby downward force on an animal part captured between the pivot plates urges the lower pivot bolt to move vertically downwardly thereby causing the pivot plates to tighten their grip on the animal part.

* * * * *